United States Patent
Wooten

[19]

[11] Patent Number: 5,826,934
[45] Date of Patent: Oct. 27, 1998

[54] CAM-ACTUATED VEHICLE SUNROOF, AND METHOD OF INSTALLING THE SAME

[75] Inventor: Ronald E. Wooten, Nuevo, Calif.

[73] Assignee: Stretch Forming Corporation, Murrieta, Calif.

[21] Appl. No.: 736,662

[22] Filed: Oct. 25, 1996

[51] Int. Cl.⁶ .................................................... B60J 7/00
[52] U.S. Cl. ........................................ 296/216.07; 52/476
[58] Field of Search ................................. 296/218, 219, 296/216, 224; 52/476

[56] References Cited

U.S. PATENT DOCUMENTS

| | | | |
|---|---|---|---|
| D. 270,185 | 8/1983 | Wooten et al. | D25/74 |
| D. 275,172 | 8/1984 | Kwan et al. | D8/323 |
| 3,972,558 | 8/1976 | Horn | 296/218 X |
| 4,120,524 | 10/1978 | Buck, Jr. | 292/263 |
| 4,428,155 | 1/1984 | Kwan et al. | 49/465 |
| 4,428,170 | 1/1984 | Wooten et al. | 296/218 X |
| 4,466,644 | 8/1984 | Wooten et al. | 292/263 |
| 4,474,405 | 10/1984 | Kloppe et al. | 296/220 |
| 4,487,449 | 12/1984 | Igel et al. | 296/216 |
| 4,618,176 | 10/1986 | Farmont | 292/296 |
| 4,618,182 | 10/1986 | Farmont | 296/223 |
| 4,626,027 | 12/1986 | Farmont | 296/223 |
| 4,684,168 | 8/1987 | Lupo | 296/217 |
| 4,844,535 | 7/1989 | Farmont | 296/224 X |
| 4,927,208 | 5/1990 | Farmont | 296/218 X |
| 5,156,435 | 10/1992 | Farmont | 296/216 |

FOREIGN PATENT DOCUMENTS

| | | | |
|---|---|---|---|
| 3120817 | 1/1983 | Germany | 296/218 |
| 2123757 | 2/1984 | United Kingdom | 296/216 |

*Primary Examiner*—Dennis H. Pedder
*Attorney, Agent, or Firm*—Nikaido, Marmelstein, Murray & Oram LLP

[57] ABSTRACT

A vehicle sunroof for installation into a roof of a vehicle includes a sunroof panel and a sunroof frame. The sunroof frame is attached to the vehicle roof through the use of rotating cam members which are disposed within the sunroof frame and which are rotatable such that cam lobes pressingly engage an inner surface of the vehicle roof or a pre-trim ring to clamp the vehicle roof between a lip of the sunroof frame and the rotating cam members. A method for attaching the sunroof frame to a vehicle includes the steps of forming an opening in the roof of a vehicle, then attaching the pre-trim ring to a lower surface of the edge of the opening. The sunroof frame is then inserted into the opening, with the sunroof frame having at least one rotatable cam members thereupon. The rotatable cam member is then rotated, to engage the pre-trim ring or the vehicle roof with an engagement surface of the cam, thereby clamping the roof between the lip of the sunroof frame and the cam or the pre-trim ring.

19 Claims, 3 Drawing Sheets

CAM-ACTUATED VEHICLE SUNROOF, AND METHOD OF INSTALLING THE SAME

BACKGROUND OF THE INVENTION:

1. Field of the Invention:

The present invention is directed to an automobile sunroof including a sunroof frame structure, a sunroof panel, associated mounting devices, and a method of installing a vehicle sunroof frame in an efficient, effective, and aesthetically pleasing manner. The present invention, therefore, provides a method and apparatus for installing vehicle sunroofs during or after vehicle manufacture in such a way as to provide a non-leaking and attractive installation, with a minimum of manual labor.

2. Description of the Related Art:

Vehicle sunroofs can be installed in vehicles during the manufacturing process, or after the vehicles have been manufactured and sold. When sunroofs are installed during the manufacturing process, it is sometimes possible to utilize specialized metalworking and specialized roof/sunroof/headliner combinations to provide a fully integrated, leakproof, factory finished installation. However, in circumstances where specialized installations are not feasible, or in situations where sunroofs are installed after a vehicle has been manufactured, numerous problems arise. A hole or an opening must be cut in a roof of a finished vehicle and in the headliner thereof, and a self-contained sunroof unit including the sunroof panels, gaskets and seals, and a sunroof frame are installed in the opening. Numerous problems exist in performing this type of installation in that it is imperative that the interface between the edge of the sunroof frame and the opening of the vehicle be sealed so that leaks do not occur, and both the interior and exterior portions of the connection must be finished to be aesthetically pleasing. Numerous aftermarket kits are available, for example, where the sunroof frame is installed from the top of the opening, and a fastening ring or tightening ring is attached from the bottom of the roof with a plurality of screws, in an attempt to tightly engage the vehicle roof and in an attempt to provide a finished look to the interior portions of the vehicle. However, in this type of installation, it is typical that screw heads and other unfinished parts remain visible, a significant amount of time is required for the installation, and leaks can sometimes occur due to improper clamping or sealing between the sunroof frame and the vehicle roof.

U.S. Pat. No. 4,428,170 discloses one alternative way of attaching vehicle sunroofs. According to this reference, a sunroof frame is installed in an opening in a vehicle, and a clamping ring or a plurality of clamping bar members are cantilevered into position by the tightening of a plurality of screws. The screws pull a wall of the clamping member into a position wherein a bottom portion of the clamping member is supported in a lower portion of the frame, and an upper wall of the bottom portion clampingly engages an inner surface of the roof of the vehicle. The screws and the clamping members must be inserted, aligned, and tightened after the frame has been inserted into the vehicle roof.

SUMMARY OF THE INVENTION:

The present invention utilizes a plurality of individual rotatable clamping devices or cams to minimize the amount of alignment which is necessary in order to clamp a sunroof frame to the roof of a vehicle, minimize the amount of loose parts which are required to be provided in a sunroof kit, and minimize the amount of time which is needed in order to install a sunroof.

As used in this specification, the term sunroof is intended to encompass the removable sunroof panel, the frame in which the sunroof panel is received, and the hardware associated with securing the frame to the roof of the vehicle. A pre-trim ring can be tacked or glued to an inner surface of the roof member to act as a clamping or engaging surface for the cams, as part of the sunroof. The rotatable cams can be attached to the sunroof frame before the sunroof frame is installed into the opening by attaching a cam member to an end of a shoulder bolt which has been inserted through a hole in the frame. A spring can be used on shafts of the rotatable cams so that the cam members are pulled inward and away from the lip of the opening. After the opening is formed in the vehicle roof and the pre-trim ring has been attached, the sunroof frame can be placed into the opening so that a lip of the frame engages the outer edge of the opening. The spring biases the bolt heads inward, to pull the cam members inward so that the sunroof frame can be inserted into the opening without interference from the cam members. The rotatable cams are then individually rotated, through rotation of the shoulder bolts, so as to pressingly engage the roof of the vehicle or the pre-trim ring, thereby clamping the frame to the roof. The headliner of the vehicle can then be trimmed, covers or molding strips can be snapped in place to cover the rotating heads of the shoulder bolts of the rotatable cams, and a retaining headliner molding can be snapped in place. A sunroof panel can then be disposed within the sunroof frame so as to sealingly engage a rubber gasket therein, thereby completing the sunroof installation.

BRIEF DESCRIPTION OF THE DRAWINGS:

For a more detailed understanding of the present invention, reference can be made to the attached drawings, wherein.

Figure 1:
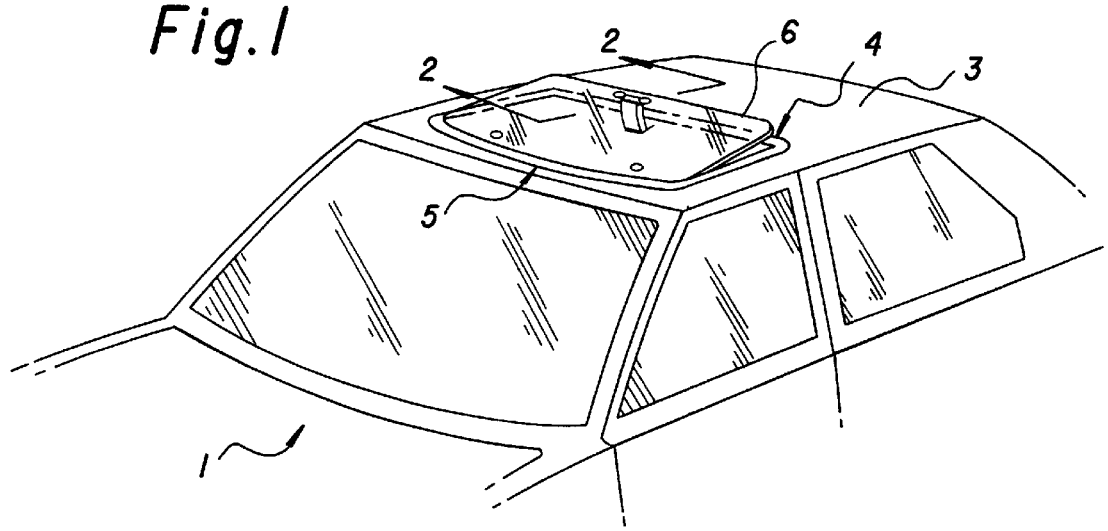
FIG. 1 is an overall illustration of a sunroof according to the present invention, installed in a roof of a vehicle.

DESCRIPTION OF THE PREFERRED EMBODIMENT:

Referring to FIG. 1, vehicle 1 is provided with roof 3 having an opening 4 cut therein. A sunroof frame 5 is inserted into opening 4, and is attached to the roof by a mechanism which is illustrated in FIGS. 2 and 3A–3E. After the sunroof frame has been secured to roof 3, sunroof panel 6, made of glass or other material, can be removably inserted therein.

Figure 2:
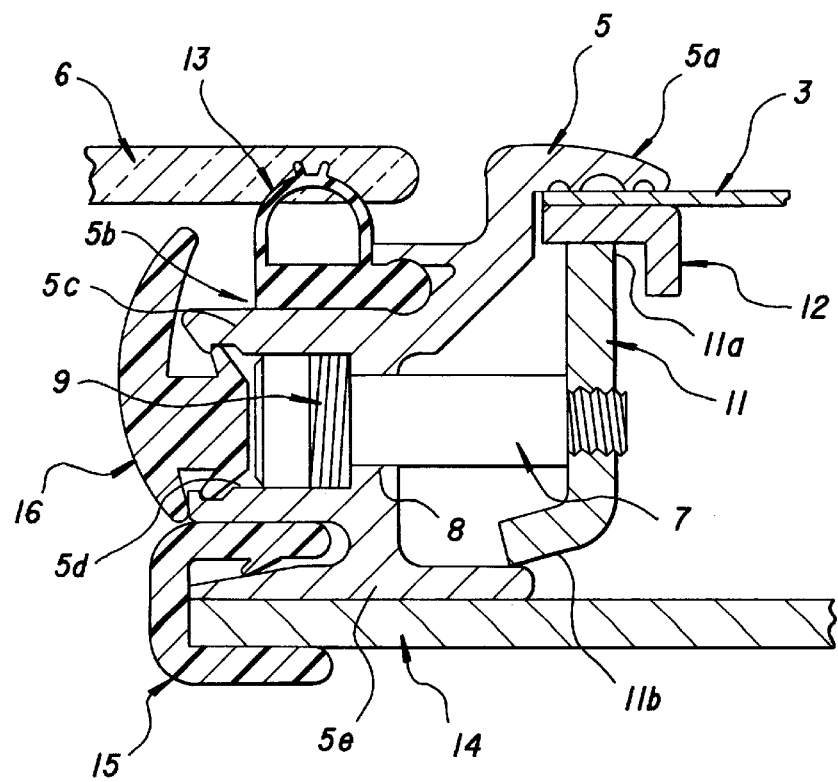
FIG. 2 is a cross-section of a sunroof frame according to the present invention along line 2—2 of FIG. 1, indicating how the elements of the frame structure cooperate to clamp the frame to the vehicle roof and to the headliner of the vehicle.
Figure 3A:
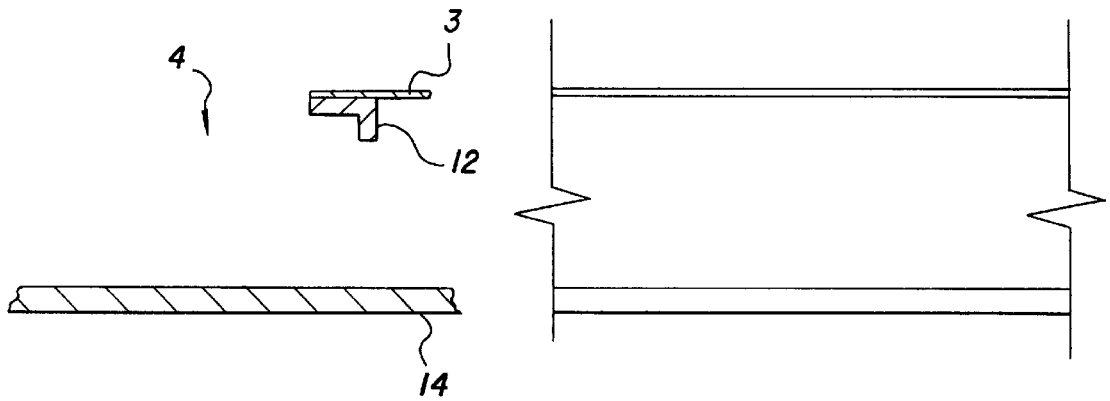
FIGS. 3A–3E illustrate various stages of installation of a sunroof frame according to the present invention in a vehicle.
Figure 3B:
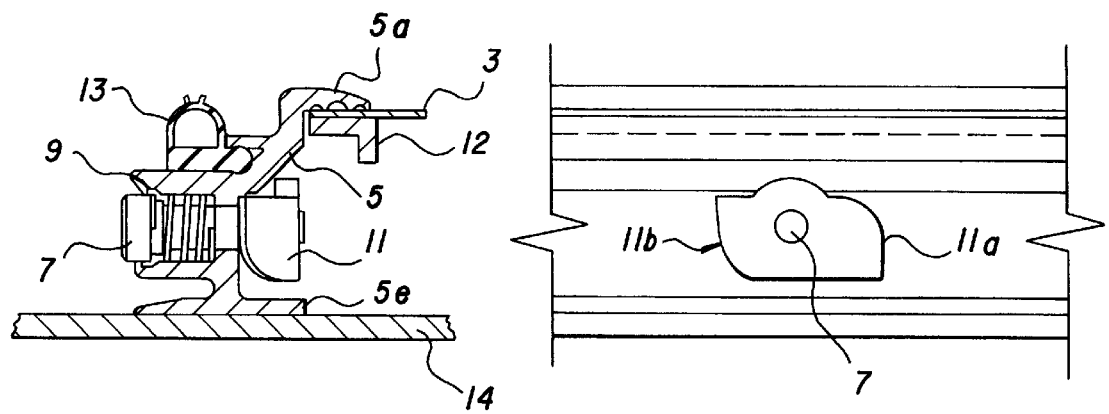
Figure 3C:
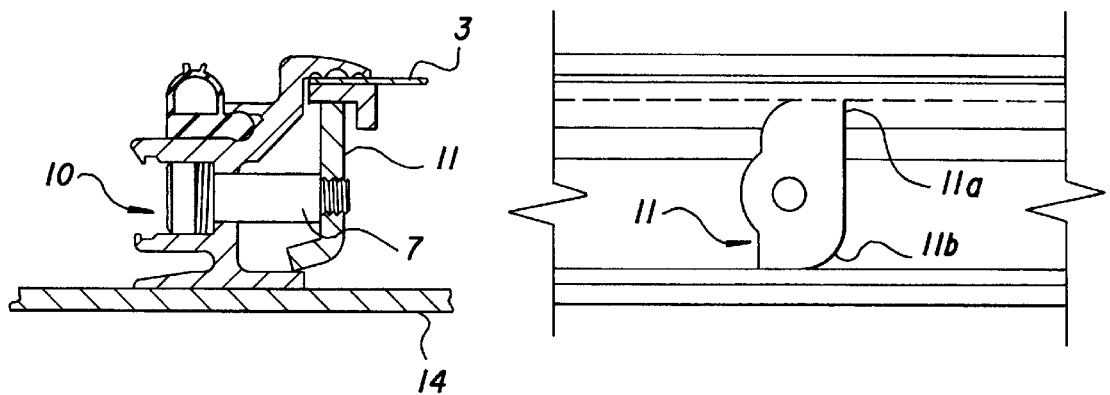
Figure 3D:
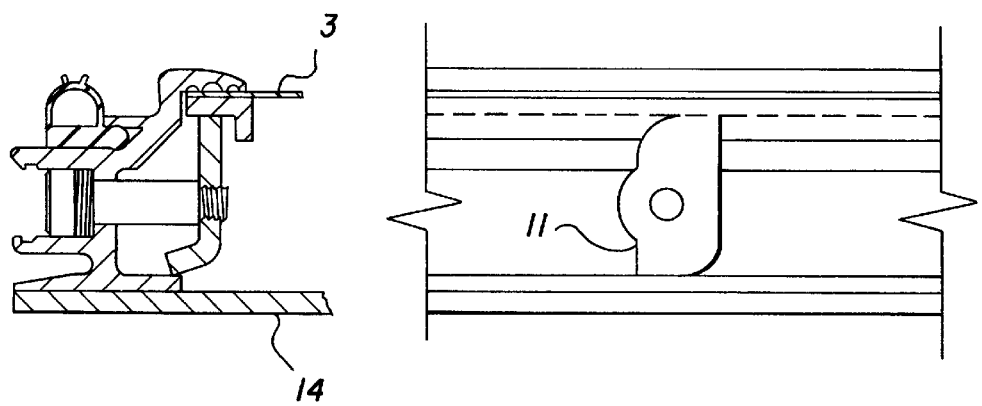
Figure 3E:
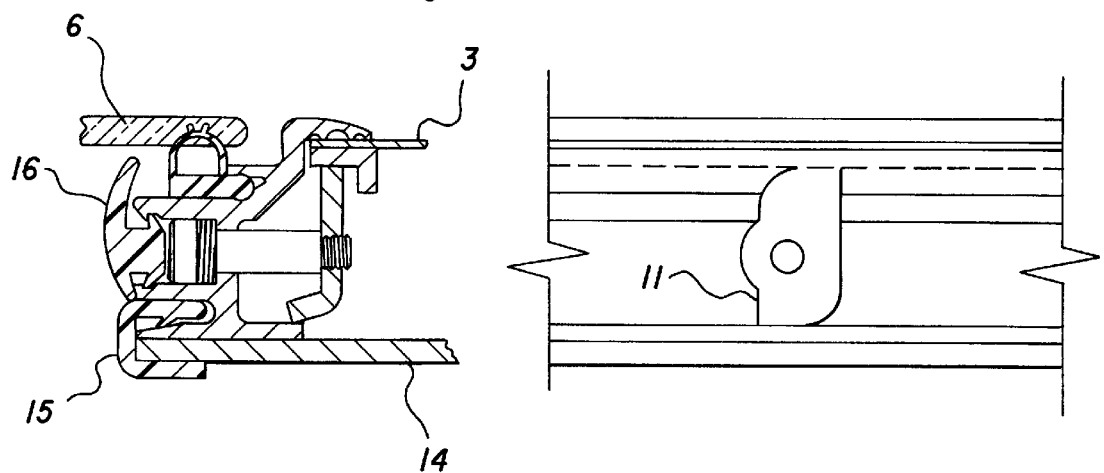

FIG. 2 illustrates a cross-section of sunroof frame 5 and the interface thereof with roof 3, along line 2—2 of FIG. 1. A plurality of shoulder bolts 7 protrude through openings or apertures 8 in frame 5, and a head of a shoulder bolt 7, along with a biasing spring 9, engages an inner portion of frame 5 surrounding opening 8. The head of shoulder bolt 7 fits in a recess or channel 10 on an inner portion of the sunroof frame. Rotatable cam 11 is fitted and secured onto the distal end of shoulder bolt 7 by threading, welding, etc., such that when the head of shoulder bolt 7 is rotated, the rotatable cam 11 rotates therewith. Pre-trim ring 12 has a shape which corresponds to the shape of the sunroof frame, and therefore which corresponds to the shape of the opening 4 in roof 1. Pre-trim ring 12 can be formed of an aluminum, metal, or plastic material, and tacked in place at the outer periphery of the opening as shown in FIG. 2. As shoulder bolt 7 is turned, cam 11 is rotated upward to engage pre-trim 12. If pre-trim 12 is not used, cam 11 can be configured to directly engage roof 3.

Sunroof frame structure 5 includes lip 5a which is configured to engage an outer surface or outer edge of opening 4, and also includes gasket support channel 5b for supporting a sunroof panel gasket 13 therein. When sunroof panel 6 is placed within the sunroof frame, sunroof panel 6 engages gasket 13 to prevent leakage into the interior of the vehicle. Channel 10, allowing the heads of shoulder bolts 7 and spring 9 to be received therein, is formed by channel members 5c and 5d, thereby enabling the shoulder portion of shoulder bolt 7 to be received in aperture 8, and enabling the head of shoulder bolt 7 along with spring 9 to engage an inner portion of channel 10. A lower portion of sunroof frame 5 includes headliner engagement portion 5e, which is configured to engage vehicle headliner 14 as shown. Headliner retainer or headliner trim 15 engages an edge of the headliner 14 and headliner engagement portion 5e to secure the headliner to the headliner engagement portion, and therefore to the sunroof frame. A cover or trim 16 engages channel members 5c and 5d to cover and trim channel 10, thereby concealing the heads of shoulder bolts 7.

A description of the installation of a sunroof according to the present invention will now be described, with reference to FIGS. 3A–3E.

Using an appropriate template or guide, an opening 4 is cut in vehicle roof 3. If pre-trim is being used, pre-trim ring 12 is then tacked to the outer periphery of opening 4, as defined by roof 3. The perimeter of the opening must correspond to the shape of pre-trim 12. The pre-trim can, therefore, act as the template for cutting the opening. Sunroof frame 5, having the rotatable cams 11, shoulder bolts 7, spring 9, and gasket 13 disposed thereon, is placed into opening 4, thereby contacting headliner 14 with headliner engagement portion 5e and the upper surface of the outer perimeter of opening 4 with lower surface of lip 5a. Opening 8 in sunroof frame 5 is unthreaded, and the shoulder portion of shoulder bolt 7 easily slides therein. Spring 9, therefore, biases shoulder bolt 7 to the left side of the figure, thereby pulling cam 11 to the left, and therefore inside a perimeter formed by headliner engagement portion 5e, so that the sunroof frame can easily be placed into the opening such that a lower surface of lip 5a engages an upper surface of the outer perimeter of opening 4 without interference from cam 11. Using a suitable tool such as a screwdriver, allen wrench, TORX(tm) screwdriver, socket wrench, etc., shoulder bolt 7 is pushed inward from the head thereof, against the biasing of spring 9, and turned such that an upper lobe 11a of cam 11 engages pre-trim ring 12. Cam 11 and headliner engagement portion 5e are configured such that a lower lobe 11b of cam 11 engages headliner support portion 5e, thereby enabling cam 11 to provide a firm upward force on pre-trim 12 as shoulder bolt 7 is turned. A plurality of rotatable cams formed by shoulder bolts 7, cam 11, and biasing spring 9 are disposed about the periphery of sunroof frame 5; all of these rotatable cams are actuated in this way, thereby providing an even clamping force between sunroof frame 5a and the outer surface of vehicle roof 3, thereby securing the frame and preventing leaks. Proper clamping is achieved after rotating the cams less than 180 degrees, due to the configuration of the cam lobes. After all of the cams are tightened, headliner 14 is trimmed to be even with an inner edge of headliner engagement portion 5e. Headliner trim or headliner retainer 15 is then snapped or pushed in place, so that headliner 14 is attached to sunroof frame 5 in an aesthetically pleasing manner. Trim 16 is then snapped in place or pushed in place between channels 5c and 5d, thereby covering opening 10 in an aesthetically pleasing manner. Retainer 15 and trim 16 can be formed of a suitable elastomeric material, in such a way as to provide a pleasing appearance with the rest of the interior of the vehicle. Sunroof panel 6, formed of glass or another suitable material, is then placed into engagement with gasket 13, and held in place by a suitable engagement device (not shown).

A sunroof according to the present invention provides numerous advantages over the known prior art. The shoulder bolt 7, spring 9, and cam 11 can be placed into the sunroof frame prior to the installation thereof. Bias springs 9 will hold cams 11 out of the way of the opening during an installation procedure. After the sunroof frame has been placed into the opening, there is no need to attempt to align a separate engagement ring or separate clamping rings, and there is no need to attempt to engage or align a plurality of separate screws with a clamping ring or clamping bar. Sizes of cams 11 according to the present invention can be varied based upon a thickness of roof 3 of the vehicle, a thickness of a pre-rim ring 12, or depending upon whether or not a pre-trim ring is used. An advantage of the pre-trim is that the pre-trim ring can evenly disperse the clamping pressure by a plurality of cams 11 so as to provide an even seal between lip portion 5a and vehicle roof 3.

Various materials can be selected for the elements of the sunroof according to the present invention. As noted above, the pre-trim ring 12 can be of extruded aluminum, composite, or a plastics material. Cam 11 and shoulder bolt 7 can be steel or another suitable material for this application. Frame 5 and the various portions and channels thereof are formed of aluminum. Other materials can be substituted, as particular applications may dictate.

Although exemplary embodiments of the present invention have been described in detail, the present invention is not limited to the specific embodiment described above. Various modifications may be made without departing from the spirit and scope of the invention, as defined in the appended claims.

I claim:

1. A vehicle sunroof frame configured to be mounted in an opening a roof of a vehicle, said vehicle sunroof frame comprising:

a sunroof frame means for supporting a sunroof panel therein, said sunroof frame means having an outer periphery which essentially corresponds to a periphery of an opening in the vehicle roof, said sunroof frame means including a support portion configured to be inserted in the opening, and a lip portion configured to engage an outer surface of an edge of the opening;

at least one rotating cam means rotatably disposed on said support portion of said frame means, said rotating cam means comprising a cam member disposed on a rotatable shaft, said cam member and said rotatable shaft being rotatable to exert a force against an inner surface of the edge of the opening thereby clamping the edge of the vehicle roof between the lip of the frame means and the rotating means, wherein said rotatable shaft penetrates said support portion of said frame means, and has said cam member fixedly disposed on an end thereof, said rotatable shaft being rotatable along an axis which is substantially parallel to a plane of the vehicle roof.

2. A vehicle sunroof frame as recited in claim 1, comprising a plurality of rotatable cam means disposed around the outer periphery of the sunroof frame.

3. A vehicle sunroof frame as recited in claim 1, comprising a plurality of said rotatable cam means, each of said rotatable cam means being rotatable by a rotation means which is accessible through a channel in said support portion of said sunroof frame.

4. A vehicle sunroof frame as recited in claim 3, further comprising cover means for covering said channel in said support portion, said cover means being pressingly engagable with said support portion to conceal said channel.

5. A vehicle sunroof frame as recited in claim 1, further comprising headliner engagement means disposed on said support portion of said sunroof frame means for engaging a headliner of the vehicle, and further comprising securing means for securing said headliner to said headliner engagement means.

6. A vehicle sunroof frame as recited in claim 1, further comprising a pre-trim means configured to engage said rotating cam means, said pre-trim means being configured to be attached to the inner surface of the edge of the opening, wherein said at least one rotating cam means is configured to pressingly engage the pre-trim means, thereby clamping the edge of the opening between the lip portion and the pre-trim means.

7. A vehicle sunroof frame as recited in claim 1, wherein said cam member has a first engagement surface on a first side thereof and a second engagement surface on a second side thereof, and wherein upon a rotation of the rotatable shaft, the first engagement surface engages the inner surface of the edge of the opening and the second engagement surface engages an opposing engagement surface on the sunroof frame, thereby providing a secure clamping force for the first engagement surface to engage the inner surface of the edge of the opening.

8. A vehicle sunroof for installation onto a vehicle, said vehicle sunroof comprising:

a sunroof panel configured to be received in a sunroof frame;

a sunroof frame configured to receive said sunroof panel, and configured to sealingly engage an opening in a roof of a vehicle, said sunroof frame comprising a lip portion for engaging an edge of the opening and a support portion configured to penetrate the opening;

a pre-trim ring configured to be attached to an inner surface of the edge of the opening, said pre-trim ring having a shape which corresponds to a shape of the edge of the opening;

at least one rotating cam means rotatably disposed in the support portion of the sunroof frame, said rotating cam means comprising a rotating cam member disposed on a first end of a rotatable shaft, said rotatable shaft disposed in an aperture in the sunroof frame, said rotating cam member comprising a first engagement surface and a second engagement surface, wherein upon a rotation of the rotating shaft the first engagement surface pressingly engages a surface of the pre-trim ring, and wherein the second engagement surface of the rotating cam engages a corresponding engagement surface on the sunroof frame;

at least one biasing means coaxially disposed on said rotatable shaft, said at least one biasing means biasing the rotatable shaft and the cam member in an inward direction wherein the cam member is biased to be within a periphery defined by the support portion of the frame means.

9. A vehicle sunroof as recited in claim 8, further comprising a headliner retaining means for securing a headliner of the vehicle to the sunroof frame.

10. A vehicle sunroof as recited in claim 8, wherein said rotating shaft is rotated by rotating a second end thereof, said second end of said rotation shaft being disposed in a channel in said support portion of said sunroof frame, said sunroof including a cover means for covering said channel in said support portion, said cover means being engagable with first and second channel members defining said channel.

11. A vehicle sunroof frame configured to be mounted in an opening in a roof of a vehicle, said vehicle sunroof frame comprising:

a sunroof frame means for supporting a sunroof panel therein, said sunroof frame means having an outer periphery which essentially corresponds to a periphery of an opening in the vehicle roof, said sunroof frame means including a support portion configured to be inserted in the opening, and a lip portion configured to engage an outer surface of an edge of the opening;

a pre-trim ring having a shape which corresponds to the periphery of the opening in the vehicle roof, said pre-trim ring being configured to be attached to an inner surface of an edge of the vehicle roof defining the periphery of the opening;

at least one rotating cam means rotatably disposed on said support portion of said frame means, said rotating cam means comprising a cam member disposed on a rotatable shaft, said cam member and said rotatable shaft being rotatable to exert a force against the pre-trim ring, thereby clamping the edge of the vehicle roof between the lip of the frame means and the pre-trim ring, wherein said rotatable shaft penetrating said support portion of said frame means, and having said cam member fixedly disposed on an end thereof, said rotatable shaft being rotatable along an axis which is substantially parallel to a plane of the edge of the opening.

12. A vehicle sunroof frame as recited in claim 11, comprising a plurality of rotatable cam means disposed around the outer periphery of the sunroof frame.

13. A vehicle sunroof frame as recited in claim 11, comprising a plurality of said rotatable cam means, each of said rotatable cam means being rotatable by a rotation means which is accessible through an opening in said support portion of said sunroof frame.

14. A vehicle sunroof frame as recited in claim 11, wherein said cam member has a first engagement surface on a first side thereof and a second engagement surface on a second side thereof, and wherein upon a rotation of the rotatable shaft, the first engagement surface engages the pre-trim ring and the second engagement surface engages an opposing engagement surface on the sunroof frame, thereby providing a secure clamping force for the first engagement surface to clamp the roof of the vehicle between the lip of the sunroof frame and the pre-trim ring.

15. A method for attaching a sunroof frame to a vehicle, said method comprising the steps of:

forming an opening in a roof of a vehicle;

inserting a sunroof frame through said opening from an upper side thereof, said sunroof frame including a lip portion which engages an upper surface of a lip of said opening after the sunroof frame has been inserted into the opening, said sunroof frame including at least one rotatable cam disposed on a rotatable shaft so as to rotate therewith on a common axis; and rotating said rotatable shaft, thereby rotating said rotatable cam to exert a force against an inner surface of the lip of the opening with an engagement surface of the cam, thereby clamping the lip of the opening between the lip portion of the sunroof frame and the engagement surface of the cam.

16. A method as recited in claim 15, further comprising the steps of:

trimming a headliner of the vehicle to correspond to a headliner engaging portion of the sunroof frame; and installing trim molding at an interface of the headliner engagement portion and the headliner of the vehicle.

17. A method as recited in claim 15, further comprising a step of attaching a trim molding along an inner periphery of the sunroof frame, thereby covering exposed portions of the at least one rotatable cam.

18. A method for attaching a sunroof frame as recited in claim 15, wherein said step of rotating said at least one rotatable cam also engages another engagement surface of the cam with a corresponding engagement surface on the sunroof frame, thereby securely supporting the cam.

19. A method as recited in claim 15, wherein said rotating step comprises rotating a plurality of rotatable cams, thereby engaging the inner surface of the lip of the opening with a plurality of engagement surfaces corresponding to the plurality of rotatable cams, thereby clamping the lip of the opening between the lip portion of the sunroof frame and the engagement surfaces of the plurality of rotatable cams at a plurality of locations about the periphery of the opening.

* * * * *